C. SCHUSTER & C. N. BERGMANN.
CONDUCTOR POST FOR ELECTRICAL DISTRIBUTION.
APPLICATION FILED MAR. 3, 1911.
1,082,772.    Patented Dec. 30, 1913.
2 SHEETS—SHEET 2.
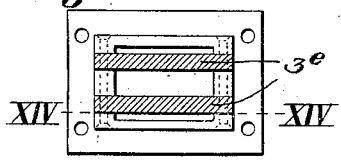
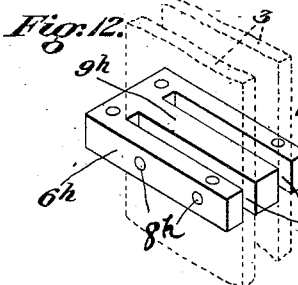
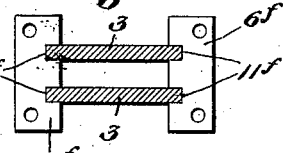
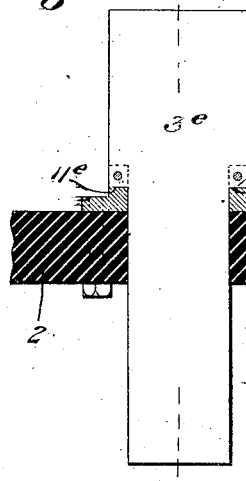
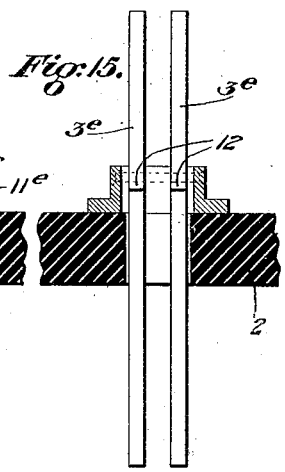
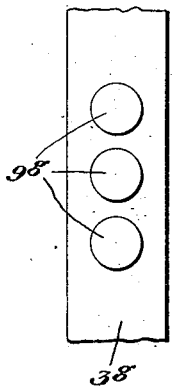
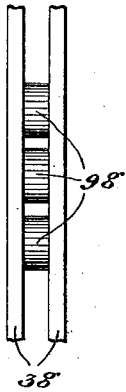
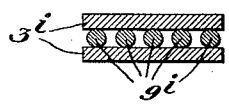
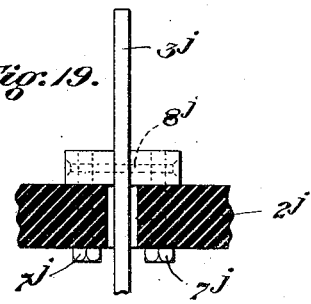
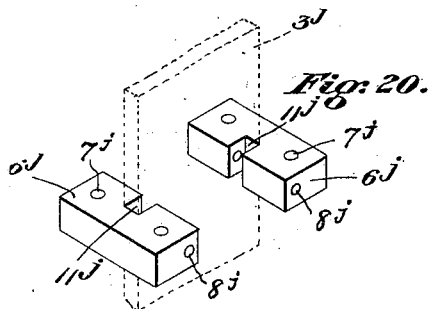
Witnesses:
Chas. S. Lepley
Henry Imes
Inventors.
Carl Schuster
Christian N. Bergmann
by C. M. Clarke Atty

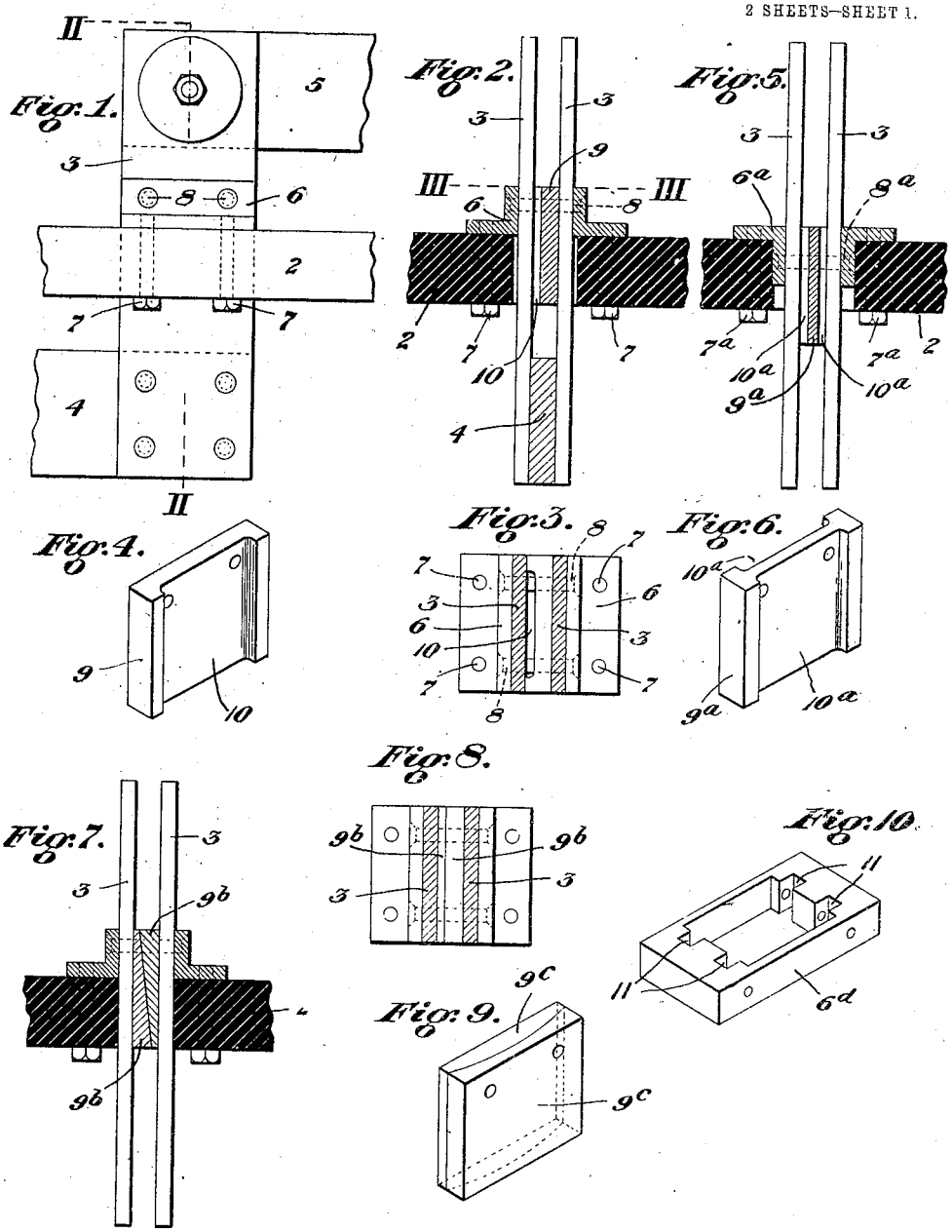

UNITED STATES PATENT OFFICE.

CARL SCHUSTER, OF BELLEVUE, AND CHRISTIAN N. BERGMANN, OF PITTSBURGH, PENNSYLVANIA, ASSIGNORS OF ONE-HALF TO SAID BERGMANN AND ONE-HALF TO SAID SCHUSTER.

CONDUCTOR-POST FOR ELECTRICAL DISTRIBUTION.

1,082,772.  Specification of Letters Patent.  Patented Dec. 30, 1913.

Application filed March 3, 1911. Serial No. 612,156.

*To all whom it may concern:*

Be it known that we, CARL SCHUSTER and CHRISTIAN N. BERGMANN, citizens of the United States, residing at Bellevue and Pittsburgh, respectively, in the county of Allegheny and State of Pennsylvania, have invented certain new and useful Improvements in Conductor-Posts for Electrical Distribution, of which the following is a specification.

Our invention relates to improvements in conducting posts for electrical distribution and is particularly adapted for use with knife switches or for making any desired connections at both sides of an insulating base, to provide for the direct transmission of electrical currents, either D. C. or A. C.

The object in view is to provide a construction having large ampere capacity and ample contact area with the requisite strength, efficiency for the objects in view, simplicity and cheapness of construction, and, when desired, necessary ventilation space.

In switches of the larger types, or in bus bar connections or other similar construction, it is desirable to provide good contact area and ample conducting cross section for the current, with means for mounting the conductors and their intervening spacer or spacers on the base, whereby to provide continuous transverse conductors having terminals extending at each side of the base and adapted for connection in the manner intended.

The present improvements are somewhat similar in construction and mode of operation, and constitute modifications of and improvements on a form of similar apparatus disclosed in the prior application of Carl Schuster for improvements in switches, filed July 6th, 1909 bearing the Serial No. 506054.

In the drawings accompanying the application:—

Figure 1 is a view of the device in side elevation as used for bus bar or switch blade connections, partly broken away. Fig. 2 is a vertical sectional view indicated by the line II. II. of Fig. 1, the conductor bars being shown in edge elevation. Fig. 3 is a horizontal sectional view indicated by the line III. III. of Fig. 2. Fig. 4 is a detail view in perspective of one form of spacer as used in said construction. Fig. 5 is a view similar to Fig. 2 showing a spacer having a ventilation space at each side and a modified construction of holding frame. Fig. 6 is a detail view of such form of spacer. Fig. 7 is a view similar to Fig. 5 showing a further modified construction of spacer. Fig. 8 is a plan view of the construction shown in Fig. 7. Fig. 9 is a detail view of a complete spacer composed of two interfitting portions having curved inner and parallel outer contacting sides. Fig. 10 is a perspective view showing a single piece construction of grooved holding frame for the conductor bars. Fig. 11 is a plan view showing a similar construction but utilizing separate grooved supporting frames for each edge of the conductor bars. Fig. 12 is a perspective view of a construction showing a one-piece frame having transverse holding slots. Fig. 13 is a plan view showing a further modified construction. Fig. 14 is a vertical sectional view indicated by the line XIV. XIV. of Fig. 13. Fig. 15 is a vertical sectional view on the line XV. XV. of Fig. 14, the conductor bars being shown in edge elevation. Figs. 16 and 17 show the use, with conductor bars, of spacing washers, in front and edge elevation respectively. Fig. 18 is a detail view showing the use of longitudinal wires interposed as spacers between the conductor bars. Fig. 19 is a sectional view similar to Fig. 2 showing the mounting of a single bar. Fig. 20 is a perspective view further illustrating the same construction.

The several constructions illustrated are intended for use, upon an insulating base 2, with a switch or bus bar of any suitable form or construction for operation with the elements to be connected by the conductor bar or bars 3, which extend transversely through said base. Said bars are intended for connection with any of the well known forms of conducting elements, as a bus bar 4 or a switch blade 5, or any number thereof, it being understood that the conductor bars 3 may be also of any desired number, whereby to present at each side of the insulating base 2, either one or a plurality of parallel separate attaching or contacting terminals. Ordinarily, said conductor bars may be mounted within any suitable embracing frame 6 mounted upon the base 2 and secured thereon by holding bolts 7, while transverse bolts or rivets 8 extend through opposite sides of the frame and through the bars 3 and through a spacer or spacers, when such are used, whereby to fixedly secure said parts in position on the frame.

As shown in Figs. 1, 2 and 3 of the drawings, the frame 6 is composed of a pair of angle pieces, secured by one leg to the base and by the other leg to the conductor bars and spacer as clearly shown. In the arrangement shown in Fig. 5, the base $6^a$ is composed of similar angle sections, the bar-embracing portions thereof being inserted within the transverse cavity through the base as shown, and secured to the bars and base in the same manner by bolts $7^a$ and rivets $8^a$. The spacer 9 and $9^a$ is of any suitable construction, but in the form shown in said figures, is provided with opposite parallel faces for engagement with the inner sides of the conductor bars and recessed at one or both sides as indicated at 10 and $10^a$ respectively, whereby to permit of ample air circulation. Such construction is preferable in the use of A. C. currents, whereby to provide for ample exposure of the conductor bars and the avoidance of eddy currents, etc.

It will be understood that the spacers are of any desired thickness, depending upon the space to be provided between the conductor bars and their terminals, where straight bars are used; also that the spacers may be composed of one or more parts laid side by side or assembled in any suitable manner, whereby to provide for adjustment of the lateral spacing of the bars, convenience in assemblage, etc., as by forming the spacers of a plurality of pieces $9^b$ having inclined or wedge-like inner faces as indicated in Figs. 7 and 8, or by forming their confronting meeting faces of curved surfaces, convex and concave respectively, as indicated at $9^c$, Fig. 9. With either of such forms, the parallelism of their sides or faces which make contact with the inner sides of the conducting bars is maintained, whereby to insure the parallelism of the bars and correct fitting and mounting on the base. Also, by adjustment of the wedge spacers, the conducting bars may be adjusted laterally to provide the desired intervening space.

In some cases, we may entirely eliminate the spacer or spacers by mounting the bars within a frame or frames suitably constructed to maintain the conductor bars in fixed operative position, as by the construction shown in Figs. 10 to 15 inclusive. In such case, the base $6^d$ may be provided with suitable attaching flanges if desired, or merely made in rectangular shape as in Figs. 10 and 13 having a flat bottom portion whereby to secure it to the insulating base by the bolts 7, and an outwardly projecting frame portion having at its opposite inner sides or ends vertically arranged receiving grooves 11 for the edges of the conductor bars. The frame may be made in a single piece as shown in Figs. 10 and 13, or may be composed of two end pieces $6^t$ having similar grooves $11^t$, spaced apart at each opposite edge of the conducting bars, and secured to the base in the same general manner, as in Fig. 11.

If desired, the conductor bars $3^e$ as shown in Figs. 13, 14 and 15 may have opposite shouldered portions 12 adapted to extend downwardly into cross receiving slots $11^e$ in the top portion of the base, in which case the outer portion of the base may be flush with the outer edges of the wider portion of the bars $3^e$.

In Fig. 12 the base $6^h$ is of one piece of metal having transverse slots $11^h$ which may be of the full width of the bars and open at the ends, with the intervening spacer section $9^h$ with one or more holding rivets $8^h$ fixedly holding the bars in place. With either construction, the bars are positively held in proper spaced relation to each other and are fixedly secured by the transverse rivets.

In the arrangement shown in Figs. 16 and 17, the conductor bars $3^g$ are adapted for mounting in any of the base supports above described and may be spaced apart by spreaders $9^g$ in the form of washers, disks or in fact separating elements of any other suitable form, adapted to fixedly space the conductor bars apart and to provide for air circulation. The spacers may also be in the form of longitudinally disposed sections of wire arranged as indicated at $9^i$, Fig. 18, between the conductor bars $3^i$, and in either of said various arrangements ample clearance space is also provided for the transverse holding rivets whereby the bars are positively connected with the base, if necessary.

In any of the various forms and arrangements above described, or with any obvious equivalent thereof, we provide for a positive, rigid mounting of the continuous conductor bars which extend through the insulating base from one side to the other, having broad area and carrying capacity for the current and efficient connection with switch blade, bus bar or other elements, the conducting bars and their spacer or spacers comprising laminæ of undiminished area and contact surface, coextensive with the area of the conducting elements with which they are connected. The conductors as thus mounted and arranged are maintained in separate relation to each other and the entire construction constitutes practically a one-piece laminated post.

In Figs. 19 and 20 we show a single flat thin conducting bar $3^j$ adapted for connection at either end with a switch blade, bus bar, or other suitable conductor. As shown, the bar passes through the insulating base 2¹ with ample clearance space for air circulation between the bar and base, and is fixedly mounted in the receiving grooves 11¹ of frames 6¹ and held by the rivets 8¹. The frames are secured to the base by bolts 7¹ and when so mounted the conductor bar is capable of transmitting a maximum ampere capacity, especially of A. C. current and has the several advantages noted.

Our improved construction will be appreciated by all those familiar with this type of electrical installation, and the invention may be adapted to various uses or applications not herein specifically referred to, by the skilled electrician, within the scope of the following claims:

What we claim is:—

1. The combination with an insulating base, of a plurality of conductor bars extending through the base, and holding means of the bars consisting of oppositely arranged frame portions fixedly secured directly to the bars and to the base and having integral means for fixedly holding the bars in spaced relation to each other.

2. The combination with an insulating base, of a plurality of conductor bars extending through the base, and holding means for the bars consisting of oppositely arranged frame portions fixedly secured directly to the bars and to the base and having integral means for fixedly holding the bars in spaced relation to each other with a continuous clearance opening between the bars.

3. The combination with an insulating base, of a plurality of conductor bars extending through the base, and holding means for the bars consisting of oppositely arranged frame portions fixedly secured directly to the bars and to the base and having grooves for receiving and fixedly holding the bars in spaced relation to each other.

4. The combination with an insulating base, of a plurality of conductor bars extending through the base, and holding means for the bars consisting of oppositely arranged individual frame portions fixedly secured directly to the bars and to the base and having integral means for fixedly holding the bars in spaced relation to each other.

5. The combination with an insulating base, of a plurality of conductor bars extending through the base, and holding means for the bars consisting of oppositely arranged frame portions fixedly secured directly to the bars and to the base and having grooves for receiving and fixedly holding the bars in spaced relation to each other and securing rivets fixedly connecting the edges of each bar to said frame portions.

6. The combination with an insulating base, of a conductor bar extending through the base, holding mechanism consisting of oppositely disposed frame members secured to the base each having a receiving groove for the edge of the bar, and rivets passing through the frames and the edges of the bar and fixedly connecting them together.

In testimony whereof we hereunto affix our signatures in the presence of two witnesses.

CARL SCHUSTER.
CHRISTIAN N. BERGMANN.

Witnesses:
C. M. CLARK,
CHAS. S. LEPLEY.